United States Patent
Sorg

[19]

[11] Patent Number: 6,048,009
[45] Date of Patent: Apr. 11, 2000

[54] DRUM HANDLING TOOL

[76] Inventor: Marvin Sorg, 7222 Flatrock Rd., Fort Wayne, Ind. 46745

[21] Appl. No.: 09/189,309

[22] Filed: Nov. 10, 1998

[51] Int. Cl.$^7$ .................................................... B25G 7/00
[52] U.S. Cl. ............................................... 294/15; 294/92
[58] Field of Search ..................... 294/4, 15–17, 294/24, 27.1, 31.1, 90, 92; 254/120, 121, 129, 131; 81/119, 178, 439

[56] References Cited

U.S. PATENT DOCUMENTS

| | | |
|---|---|---|
| 417,578 | 12/1889 | McNeill et al. . |
| 831,066 | 9/1906 | Hawks .................................. 294/24 |
| 927,653 | 7/1909 | Heckman ............................... 294/17 |
| 977,245 | 11/1910 | Wiest ................................... 254/129 |
| 1,031,964 | 7/1912 | Reinehr ................................ 294/15 |
| 1,657,100 | 1/1928 | Wilson et al. . |
| 1,714,401 | 5/1929 | Sigsbee . |
| 1,736,585 | 11/1929 | Fehlhaber ............................. 254/120 |
| 2,086,722 | 7/1937 | Matuella .................................. 81/119 |
| 2,200,879 | 11/1940 | Hayden et al. ....................... 294/27.1 |
| 2,262,273 | 11/1941 | Ferrara . |
| 2,605,128 | 7/1952 | Schneider . |
| 2,784,996 | 3/1957 | Schaefer . |
| 4,483,561 | 11/1984 | Graham, Jr. . |
| 4,619,475 | 10/1986 | Sylvest, II ............................. 294/90 |
| 4,762,303 | 8/1988 | Thomas ................................. 294/17 |
| 5,333,924 | 8/1994 | Furnes . |
| 5,695,230 | 12/1997 | Thompson ............................. 294/15 |
| 5,826,926 | 10/1998 | Levey et al. ............................ 294/4 |

FOREIGN PATENT DOCUMENTS 225180 10/1959 Australia ................................ 294/15

*Primary Examiner*—Dean J. Kramer
*Attorney, Agent, or Firm*—Paul W. O'Malley; Susan L. Firestone

[57] ABSTRACT

A drum handling tool is provided by a lever having a plurality of gripping cradles. Each gripping cradle has a plurality of gripping elements disposed relative to one another to allow positioning of the gripping elements in impinging contact with both major surfaces of a cylindrical rim section to provide at least two, spaced areas of contact between the gripping cradle and each major surface of the section. The spacing of the gripping elements of each gripping cradle is different from the spacing for the gripping elements of the remaining gripping cradles allowing each gripping cradle to be used with cylindrical rim sections different widths and circumferences.

3 Claims, 2 Drawing Sheets

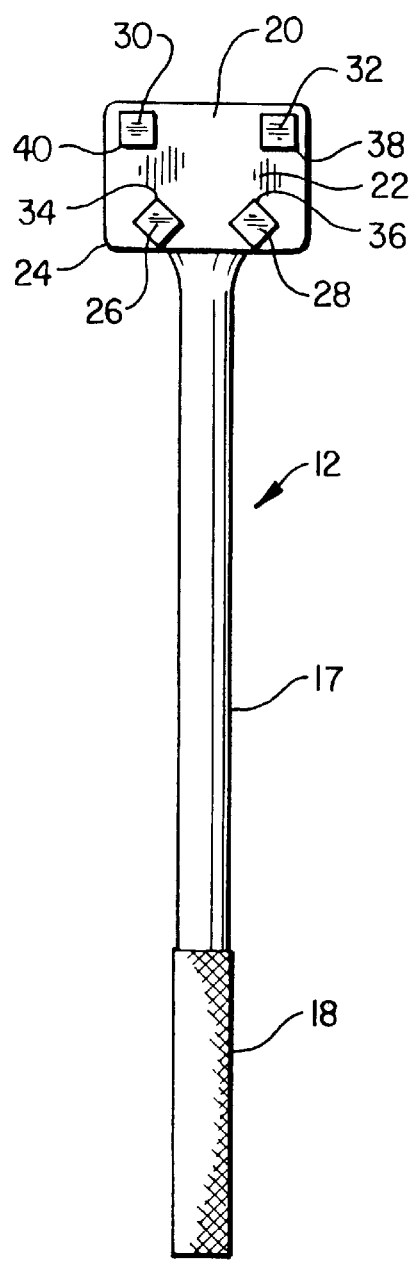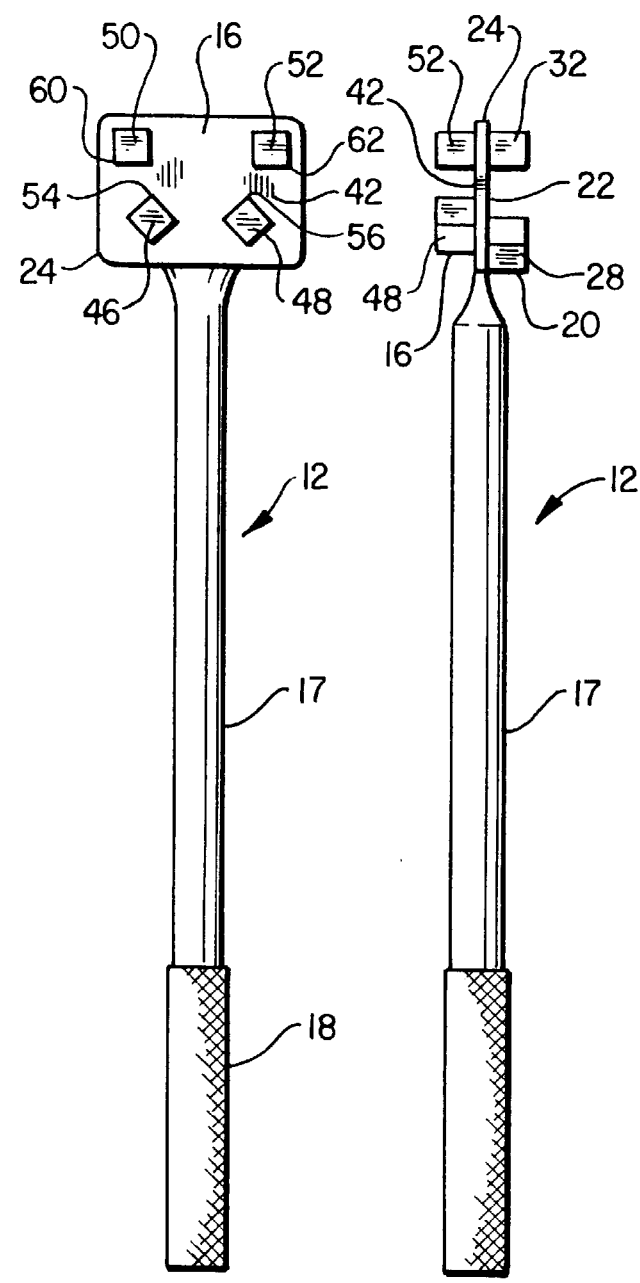

DRUM HANDLING TOOL

BACKGROUND OF THE INVENTION

The present invention relates to an apparatus for manipulating heavy cylindrical storage containers, particularly where the containers may be either opened or closed by removal or replacement of a flanged lid and the containers are stored upright.

Cylindrical containers, such as barrels and drums, are routinely stored in an upright position, resting on one of their flattened ends. To save floor space, the containers are pressed close together. Workers frequently need to read labeling applied to the containers' exterior walls to find a particular container, or to move the containers for use or for transport. The close proximity of the containers to one another, including the chance that they have become wedged together, combined with weights frequently approaching 350 kg., complicate the performance of the workers' duties. Workers frequently have difficulty separating and turning the containers.

The art has long recognized that giving a worker a lever to handle, move, lift and turn various drums, barrels and other cylindrical containers is an effective approach to the basic problems involved with moving and positioning such vessels. The problem posed typically involves how and where to attach the lever to the container. In attaching the lever, consideration must be given to the direction of extension of the lever relative to the container.

Several patents illustrate attachment of a manipulating lever to an end rim of a container. For example, U.S. Pat. No. 417,578 to McNeill, et al., illustrates attachment of lever to a barrel rim for handling barrels that are stored on their sides. McNeill provides a lever for lifting the barrel by its end and for controlling rolling of the barrel for positioning. A secure attachment of the lever to the barrel was achieved by providing two impinging points of contact between a claw attached to one end of the lever and both the interior and exterior surfaces of the rim or "chine" of the barrel. The claw and its hooks are oriented to position the lever so that it extends from the body of the barrel in a direction substantially aligned with the barrel's direction of elongation.

U.S. Pat. No. 5,333,924 to Furnes teaches a lever having a "gripping organ" or claw for grasping the rim of a cylindrical container to allow use of the lever to move and to lift individual containers when stored in an upright position. The claw is attached to an end of the lever in a way to position the lever perpendicular to the major axis of the container. In use, the claw impinges both the interior and exterior major surfaces of a barrel flange. Furnes emphasizes shaping the working elements of the claw to fit closely to the surfaces that the elements will face in use. This approach should work well where the worker can expect to encounter rims of a single, standard dimension.

In some environments a worker cannot count on drums being of a standard size. Even where the drums are of a standard size, the flange on which a claw or gripping cradle is to be used may be the rim of a flanged lid or the lip of an opened drum itself. The rim and the lip will usually not have the same dimensions. A tool should allow for different circumferences of drums, or for rims of different thicknesses.

SUMMARY OF THE INVENTION

A drum turning tool is provided by a lever to one end of which are attached a plurality of gripping cradles. Each gripping cradle has a plurality of gripping elements disposed relative to one another to allow positioning of the gripping elements in impinging contact with both major surfaces of a cylindrical rim section to provide at least two, spaced areas of contact between the gripping cradle and each major surface of the rim section. The spacing of the gripping elements of each gripping cradle is different from the spacing for the gripping elements of the remaining gripping cradles, allowing each gripping cradle to be used with cylindrical rim sections of different widths or circumferences.

Gripping cradles are provided by a base plate depending from one end of the lever and having at least first and second major planar surfaces. Each gripping cradle is formed by a plurality of mutually spaced digits extending substantially parallel to one another from the major surface. Each digit in a given gripping cradle has a gripping edge aligned with the direction of extension of the digit from the major surface, and each digit is paired with another digit from the same cradle, the pair of digits having at least partially opposed gripping edges for impinging both the interior and exterior major surfaces of the cylindrical rim section.

Additional effects, features and advantages will be apparent in the written description that follows.

BRIEF DESCRIPTION OF THE DRAWINGS

FIG. 2 is a top plan view of a preferred embodiment of the drum turning tool;

FIG. 3 is a bottom plan view of the preferred embodiment of FIG. 2; and

FIG. 4 is a side elevation of the preferred embodiment of FIG. 2.

DETAILED DESCRIPTION OF THE INVENTION

Figure 1:
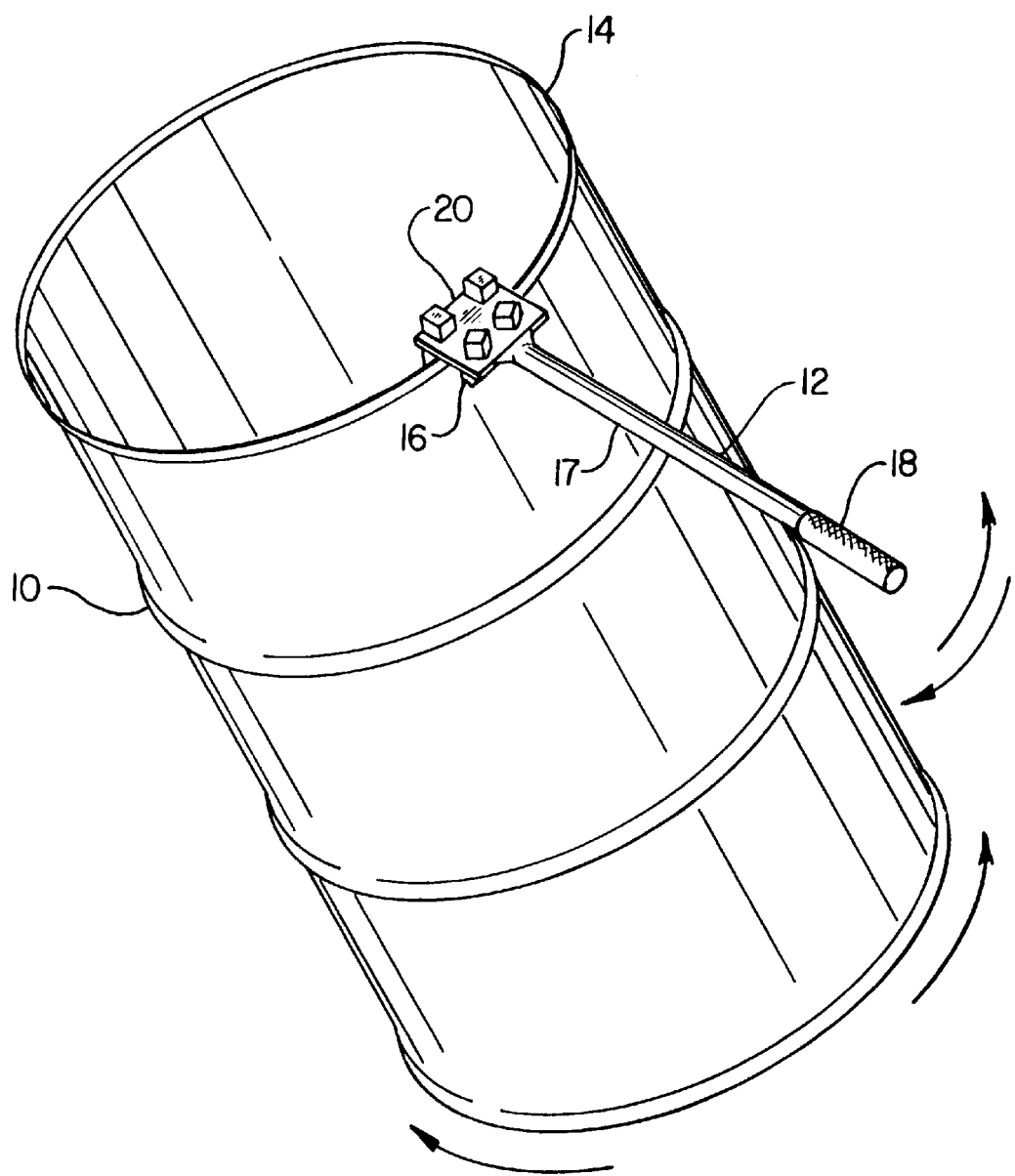
FIG. 1 is a perspective view of a drum with the drum turning tool of the present invention.

Referring now to the drawings, and in particular to FIG. 1, a cylindrical drum 10 illustrates use of a drum handling tool 12 constructed in accordance with the present invention. As illustrated, a first claw 16, depending from the forward end of tool 12 proximate to a flanged cylindrical rim 14, is positioned over the rim. A handle 17 of tool 12 extends outwardly from the drum 10, generally perpendicularly to the main cylindrical side wall of the drum. With claw 16 fitted snugly over rim 14 a worker may grasp a handle grip 18, positioned on the distal end of handle 17, to gain rotational leverage over drum 10. This allows the worker to move the drum 10 clockwise or counterclockwise synchronously with the handle 17, as indicated by the arrows. Rim 14 may be a upturned flange from a lid or the lip of drum 10. Depending upon the thickness and circumference of the flange or lip, the worker may select either first claw 16 or a second claw 20 with which to engage drum 10. First claw 16 and second claw 20 are differentially sized, as described below, to fit cylindrical walls of differing circumferences and thicknesses.

FIG. 2 illustrates a preferred configuration for a second claw 20, which extends from a major planar surface 22 formed on a base plate 24, which in turn extends from one end of handle 17. Claw 20 is formed on planar surface 22 by four gripping digits 26, 28, 30 and 32 which extend parallel to one another from the planar surface. The gripping digits 26, 28, 30 and 32 are conveniently provided by soldering or welding ¾" cube pieces of steel onto the planar surface 22.

Gripping digits 26, 28, 30 and 32 are each oriented to present a single vertical edge to a cylindrical wall introduced between the digits with digits 26 and 28 positioned to the outside of the cylinder and digits 30 and 32 positioned on the inside of the cylinder. Cubic digits are used for convenience in manufacturing. The cubes digits 26 and 28, which are intended to lie outside of the cylinder wall during use of tool 12, should be oriented so that the major surfaces of the digits will not become tangential at any point with a cylindrical surface. Digits 26 and 28 may be constructed to have a shape other than cubic to assure that a single edge is presented to an adjacent surface of almost any shape. For example, a generally cylindrical digit could be provided with a sawtooth ridge pattern. The ridges would be parallel to the center axds of the cylinder and perpendicular to the planar surface 22. Such an arrangement, while more expensive to fabricate, would tolerate a greater variety of rim flange thicknesses and circumferences. Similarly, digits 30 and 32 could be in other than a cubic shape.

Digits 26, 28, 30 and 32 each have a vertically oriented gripping edge, gripping edges 34, 36, 38 and 40, respectively. The arrangement and spacing of gripping edges 34, 36, 38 and 40 is set to fit snugly against adjacent interior and exterior cylindrical surfaces of a drum lid or rim flange when tool 12 is in use. The gripping edges 34, 36, 38 and 40 are arranged as the vertices of a trapezoid, thereby avoiding an alignment of retaining forces against the rim.

FIG. 3 illustrates a preferred configuration for first claw 16, which extends from a major planar surface 42 formed on a base plate 24. Claw 16 is formed on planar surface 42 by four gripping digits 46, 48, 50 and 52 which extend parallel to one another, outwardly from and perpendicular to the planar surface. The gripping digits 46, 48, 50 and 52 are conveniently provided by soldering or welding ¾" cube pieces of steel onto the planar surface 42. Gripping digits 46, 48, 50 and 52 are each oriented to present a single vertical edge to a cylindrical wall introduced between the digits with digits 46 and 48 positioned to the outside of the cylinder and digits 50 and 52 positioned on the inside of the cylinder. Cubic digits are used for convenience in manufacturing. The cubes digits 46, 48, 50 and 52 intended to lie outside of the cylinder wall in use should be oriented so that the major surfaces of the digits will not become tangential at any point with a cylindrical surface.

Digits 46, 48, 50 and 52 each have a vertically oriented gripping edge, gripping edges 54, 56, 62 and 60, respectively. The arrangement and spacing of gripping edges 54, 56, 62 and 60 is set to fit snugly against adjacent interior and exterior cylindrical surfaces of a drum lid or rim flange when tool 12 is in use.

FIG. 4 is a side view illustrating the differentiated spacing between the digits of claw 16 and claw 20. Opposed pairs of digits, that is, the digits of a particular claw to one side or the other of the center line of handle 17 are placed closer together for working with a thin cylindrical rim, for example digits 48 and 52 of claw 16 are placed closer together than are digits 28 and 32 of claw 20. Claw 20 is adapted to work with thicker cylindrical walls.

The tool of the present invention provides a workers with a lever readily used for moving both closed and opened drums. The tool can also allow for different circumferences of drums, and for rims of different thicknesses.

While the invention is shown in only one of its forms, it is not thus limited but is susceptible to various changes and modifications without departing from the spirit and scope of the invention.

I claim:

1. A drum handling tool comprising:
   a lever having forward and rearward ends;
   a base member depending from the forward end of the lever;
   a first planar surface on the base member;
   a second planar surface on the base member;
   a plurality of gripping edges projecting outwardly from the first planar surface including,
      first and second forward oriented gripping edges, and
      first and second rearward oriented gripping edges; and
   a plurality of gripping edges projecting outwardly from the second planar surface including,
      first and second forward oriented gripping edges, and
      first and second rearward oriented gripping edges; and
   the gripping edges projecting from the first planar surface and the second planar surface being arranged at the vertices of a trapezoid.

2. A drum handling tool as claimed in claim 1, wherein the gripping edges projecting from the first planar surface are spaced to fit around the interior and exterior circumferences of a cylindrical drum and the gripping edges projecting from the second planar surface are spaced to fit around the interior and exterior surfaces of a flange to a cap for the cylindrical drum.

3. A drum handling tool comprising:
   a lever;
   a base plate depending from an end of the lever having first and second parallel major surfaces;
   first and second gripping cradles extending from the first and second parallel major surfaces, respectively;
   each gripping cradle having a plurality of mutually spaced gripping digits extending substantially parallel to one another and perpendicular to an adjacent major surface to allow positioning of the gripping digits into impinging contact with both major surfaces of a cylindrical rim section and thereby providing at least two, spaced areas of contact between the gripping cradle and each major surface, and
   the spacing of the gripping digits of the respective gripping cradles differing from each other such that each gripping cradle fits cylindrical rim sections of differing widths and circumferences;
   each gripping digit having a gripping edge aligned with the direction of extension of the digit from the major surface; and
   each gripping digit being paired with another gripping digit, the pair of gripping digits having at least partially opposed gripping edges for impinging both the interior and exterior major surfaces of the cylindrical rim section.

* * * * *